UNITED STATES PATENT OFFICE.

CONRAD SCHRAUBE AND ERHART SCHLEICHER, OF LUDWIGSHAFEN, GERMANY, ASSIGNORS TO THE BADISCHE ANILIN AND SODA FABRIK, OF SAME PLACE.

BLACK TRISAZO DYE.

SPECIFICATION forming part of Letters Patent No. 644,334, dated February 27, 1900.

Application filed September 27, 1899. Serial No. 731,833. (No specimens.)

*To all whom it may concern:*

Be it known that we, CONRAD SCHRAUBE, doctor of philosophy, a subject of the King of Prussia, German Emperor, and ERHART SCHLEICHER, doctor of philosophy, a subject of the Duke of Saxe-Meiningen, residing at Ludwigshafen-on-the-Rhine, in the Kingdom of Bavaria and Empire of Germany, have invented new and useful Improvements in the Manufacture of Black Trisazo Dyes, (for which application for patent has been filed in Germany, No. B. 24,448, dated March 20, 1899,) of which the following is a specification.

In the Letters Patent No. 590,088, granted to Carl Bülow, the manufacture of black disazo dyes from the oxy-naphthylamin-sulfoacid ($NH_2.OH.SO_3H-1.8.4$) by combining one molecular proportion of this acid with two molecular proportions of the same or different diazo compounds is described.

Our present invention relates to the manufacture of a trisazo dye from the same oxy-naphthylamin-sulfoacid by combining it with one molecular proportion of diazo-sulfanilic acid and one molecular proportion of diazo-azo-benzene.

The following example will serve to illustrate the manner in which our invention can best be carried into practical effect and the new black trisazo dye obtained.

Example: First prepare the monoazo dyestuff obtained by the combination of sulfanilic acid with oxy-naphthylamin-sulfoacid in acid solution in the well-known way, and using, say, one hundred and ninety-five (195) parts of pure and dry sodium sulfanilate and two hundred and thirty-nine (239) parts of the pure oxy-naphthylamin-sulfoacid, both free from water of crystallization. Dissolve the said monoazo dyestuff in water with the aid of four hundred and eighty (480) parts of calcined soda. Stir the solution well and while stirring run in a solution of diazo-azo-benzene obtained in the well-known way from one hundred and ninety-seven (197) parts of amido-azo-benzene, four hundred and fifty (450) parts of hydrochloric acid, (containing about thirty-two per cent. HCl,) and seventy-five (75) parts of sodium nitrite. The new trisazo dye forms quickly. Warm the solution up and precipitate it with common salt. Collect by filtration and work up in any well-known way.

The term "diazo-azo-benzene," it is of course understood, includes any diazo-azo-benzene body—as, for example, diazo-azo-toluene, which, as known, is a homologue of diazo-azo-benzene—and if in the foregoing example the diazo-azo-benzene is replaced by the equivalent quantity of its homologue, diazo-azo-toluene, the same dye or product is formed.

Our new coloring-matter thus obtained dyes wool from the acid-bath and derives an especial value from its great fastness to light. It is characterized by the following properties: It is soluble in cold water, giving a violet solution, turning grey-blue on heating and greenish blue on addition of a caustic-soda solution. In pure sulfuric acid it is soluble, giving a solution possessing a blackish color. In this way it is readily distinguished from the disazo coloring-matters of the aforesaid Letters Patent No. 590,088. It resembles the said coloring-matters in that it is destroyed by treatment with diazo-benzene-sulfoacid in alkaline solution.

Now what we claim is—

The new black trisazo dye which can be obtained from oxy-naphthylamin-sulfoacid ($NH_2.OH.SO_3H-1.8.4$) by combining one molecular proportion of this acid with one molecular proportion of diazo-sulfanilic acid in acid solution, and one molecular proportion of diazo-azo-benzene body in alkaline solution, and which is soluble in cold water giving a violet solution, turning grey-blue on heating and greenish blue on addition of caustic soda, soluble in pure sulfuric acid giving a blackish solution, and which is destroyed by treatment with diazo-benzene-sulfoacid in alkaline solution, all substantially as described.

In testimony whereof we have hereunto set our hands in the presence of two subscribing witnesses.

CONRAD SCHRAUBE.
ERHART SCHLEICHER.

Witnesses:
BERNHARD C. HESSE,
ADOLPH REUTLINGER.